United States Patent [19]
Baker

[11] Patent Number: 6,115,159
[45] Date of Patent: Sep. 5, 2000

[54] APPARATUS FOR FIBER OPTIC TRIAXIAL CAMERA INTERFACE

[75] Inventor: Eugene E. Baker, Shrewsbury, Mass.

[73] Assignee: Telecast Fiber Systems, Inc., Worcester, Mass.

[21] Appl. No.: 08/829,323

[22] Filed: Mar. 27, 1997

[51] Int. Cl.[7] .............................. H04J 14/02; H04N 7/18
[52] U.S. Cl. ..................... 359/132; 359/132; 359/125; 359/127; 348/156; 348/158; 348/143
[58] Field of Search .................................. 359/125, 127, 359/132, 152; 348/14, 42, 156, 158, 159; 379/102.03, 102.04

[56] References Cited

U.S. PATENT DOCUMENTS

| | | | |
|---|---|---|---|
| 5,150,442 | 9/1992 | Desmons ................................. | 385/101 |
| 5,162,937 | 11/1992 | Heidemann et al. .................... | 359/124 |
| 5,572,348 | 11/1996 | Carlson et al. ........................ | 359/125 |
| 5,701,581 | 12/1997 | Eto et al. ............................... | 455/5.1 |
| 5,748,348 | 5/1998 | Heidemann et al. .................... | 359/125 |
| 5,793,506 | 8/1998 | Schmid ................................... | 359/125 |

OTHER PUBLICATIONS

Cerny, Richard A., "Using Fiber in the Field," Reprint from *Broadcast Engineering* ®, pp. 1–4 (Jan. 1996).
"Cobra™370–SI Fiber Optic Triax Camera Interface—For Sony® Ikegami® Cameras," brochure from Telecast Fiber Systems, Inc., pp. 1–2 (Apr., 1996).

*Primary Examiner*—Jason Chan
*Assistant Examiner*—Mohammad Sedighian
*Attorney, Agent, or Firm*—Hamilton, Brook, Smith & Reynolds, PC

[57] ABSTRACT

Apparatus for providing an interface between a triaxial cable and a fiber optic cable for transmission of television signals between a camera and a camera control unit includes first and second converter circuits coupled between the triaxial cable and the fiber optic cable. The first converter circuit converts a first electrical signal received from the triaxial cable to an optical output signal. The second converter circuit converts an optical input signal received from the fiber optic cable to a second electrical signal. The first and second electrical signals each include a plurality of television signals in a frequency division multiplex format. The first converter circuit includes a plurality of bandpass filters coupled in parallel to receive the first electrical signal each of which passes one of the first television signals. The second converter circuit includes a plurality of bandpass filters coupled in parallel to receive the second electrical signal, each of which passes one of the second television signals. The converter circuits provide automatic gain control of the bandpass filtered television signals to automatically adjust for varying lengths of triaxial and fiber optic cable. The apparatus includes a power control circuit operable to control power to the camera. The apparatus enhances the operating distance of triaxial cameras without having to modify the camera and camera control hardware.

9 Claims, 3 Drawing Sheets

APPARATUS FOR FIBER OPTIC TRIAXIAL CAMERA INTERFACE

BACKGROUND OF THE INVENTION

In the broadcast industry, certain television cameras, particularly high performance cameras used in program production, can be remotely controlled and powered from a local or distant camera control unit (CCU), sometimes called a base station, through a transmission medium known as triaxial cable. The triaxial cable is a shielded coaxial cable designed to simultaneously transmit various bi-directional information and/or control signals and provide power from the CCU to the camera. Signals typically may include program video (component or composite), program audio, return video, viewfinder video, genlock, return audio, IFB (interrupt foldback), Teleprompter, tally, call, intercom, and bi-directional camera control data. These signals may be analog, such as AM or FM, and/or digital in nature. Power may be in the form of AC or DC. Since there is typically only one physical cable, it is the function of the camera system's triaxial adapter to encode and/or modulate the required video, audio, intercommunications and data signals onto the proper frequencies. These frequencies are typically frequency division multiplexed for transmission, with assigned frequencies travelling in their specified directions on the triaxial cable. Other techniques, such as digital hybrid transmission, may also be used in addition to frequency division multiplexing techniques. The triaxial adapter demodulates the composite signal at either of the receiving ends of the triaxial cable into the respective baseband signals. The triaxial adapter may be contained within the camera and/or CCU ends, or may be separate units that attach to the camera and/or CCU ends.

Since the information signals are typically high frequency broadband RF signals, the effective distance over which the camera and CCU can communicate and operate is limited to one to three kilometers. In addition, a trend in the industry has been towards cameras having higher performance and wider information bandwidths, thus further limiting the distance of a wideband, component triaxial camera system to approximately one kilometer. In order to compensate, users may utilize a larger, heavier cable, which may increase distance, but also increases time and labor to deploy and take up the cable. This distance limitation often interferes with the user's ability to produce the desired programming.

SUMMARY OF THE INVENTION

A solution offered by some camera manufacturers is to provide a fiber optic interface directly on the camera and on the CCU. However, this solution requires significant investments in new CCUs, cameras and supporting infrastructure.

There is a need in the broadcast industry to enhance the operating distance of existing and new triaxial cameras without having to modify the camera and CCU hardware.

The above and other problems are solved by the fiber optic triaxial camera interface apparatus of the present invention. Fiber optic cable combines the advantages of increasing distance with smaller, lightweight cabling.

Accordingly, apparatus for providing an interface between a triaxial cable and a fiber optic cable for transmission of television signals includes first and second converter circuits coupled between the triaxial cable and the fiber optic cable. The first converter circuit is operative to convert a first electrical signal received from the triaxial cable to an optical output signal. The second converter circuit is operative to convert an optical input signal received from the fiber optic cable to a second electrical signal. The first and second electrical signals each include a plurality of television signals in a frequency division multiplex format. The first converter circuit includes a plurality of bandpass filters coupled in parallel to receive the first electrical signal each of which passes one of the first television signals. The second converter circuit includes a plurality of bandpass filters coupled in parallel to receive the second electrical signal, each of which passes one of the second television signals.

According to an aspect of the invention, the first and second converter circuits provide automatic gain control of the bandpass filtered television signals to automatically adjust for varying lengths of triaxial and fiber optic cable.

According to another aspect of the invention, the apparatus is coupled to a camera through the triaxial cable and includes a power control circuit operable to control power to the camera.

According to another aspect, a system for transmission of information signals between a camera and a camera control unit includes a first interface unit coupled to the camera through a section of triaxial cable and a second interface unit coupled to the camera control unit through another section of triaxial cable. The first and second interface units are coupled to each other through a fiber optic cable. The first and second interface units include converter circuitry that provides electro/optical and opto/electrical conversion between the camera and camera control unit.

The term "triaxial camera" is used throughout the disclosure to indicate a camera having a physical interface to a triaxial cable. In certain cases, especially for short distances, the functions of a triaxial cable may be performed on an ordinary coaxial cable. However, the RF modulation techniques and functions are similar. Therefore, throughout the disclosure, the term triaxial cable will include coaxial cable serving the purpose described.

The present invention has particular applicability for mobile television sports production including golf, skiing and other events where the events themselves may be some distance from the camera control equipment at a production base station. The present invention further saves time and labor in arranging outside broadcast events. Use of fiber optic cables can eliminate more than 90% of the typical cable weight of triaxial cables. The present invention also provides the ability to connect a triaxial camera to existing fiber optic cabling, such as a data communications network, in a building, campus, sports venue, or other facility, without the need to pull triaxial cables. This also lends itself to using existing fiber optic cable for linking cameras in one facility with CCU units in another facility, within a metropolitan area, or between cities. The preferred embodiment of the present invention can be used with triaxial-based cameras provided by Sony, Philips and Ikegami, but it is not limited to such systems. Fiber optic cable eliminates all types of electromagnetic and radio frequency interference as well as ground faults and hum.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
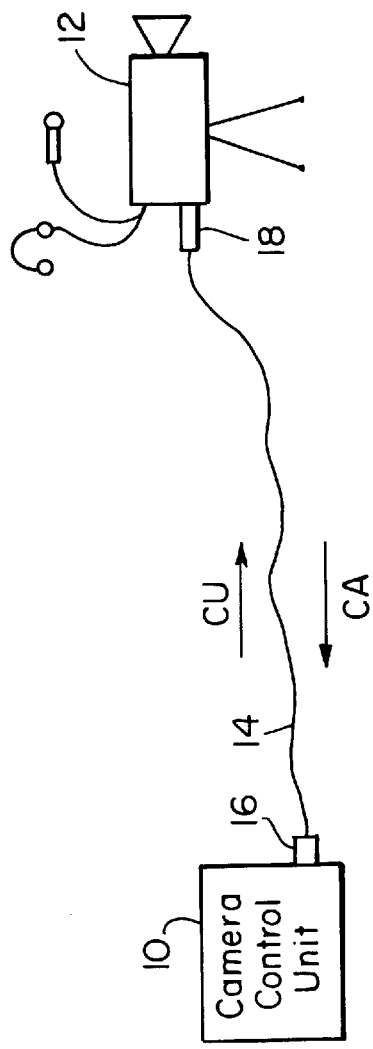
FIG. 1 is a schematic block diagram of a prior art triaxial camera control system.

A prior art camera control system is shown in FIG. 1. The system includes a camera control unit (CCU) 10 linked to a camera 12 using a triaxial cable 14. The CCU 10 and the camera 12 each include a triaxial connector 16, 18 respectively for coupling television program signals to the triaxial cable 14. Specifically, the CCU 10 originates program signal CU and the camera 12 originates program signal CA. The signals CU and CA may include, for example, program video, return video, viewfinder video, gen-lock, intercom and other audio program signals. The range of a typical triaxial-based camera control system is on the order of 4000 feet.

Figure 2:
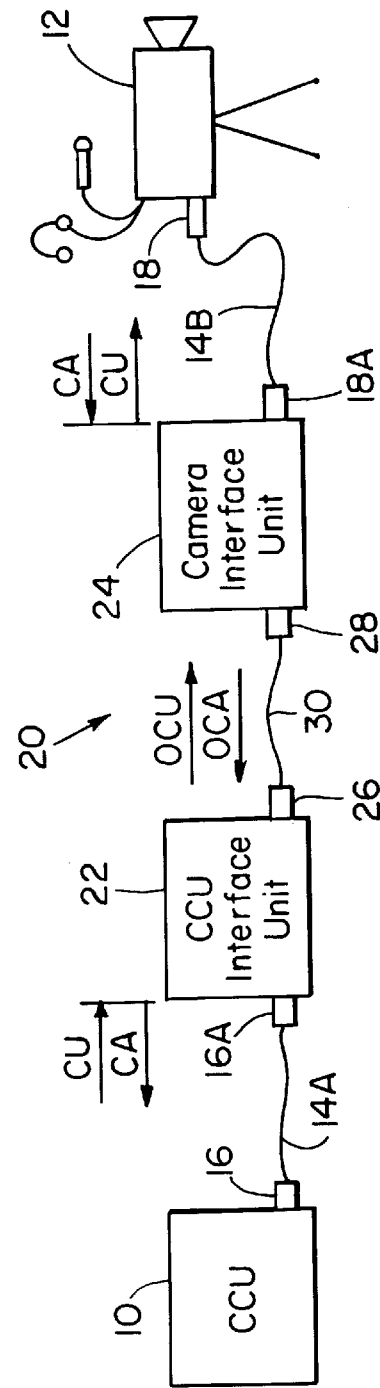
FIG. 2 is a schematic block diagram of a fiber optic triaxial camera control system in accordance with the present invention.

Referring now to FIG. 2, a fiber optic triaxial camera control system 20 is shown which illustrates the principles of the present invention. The system 20 generally comprises a camera control interface unit 22, a camera interface unit 24, and a fiber optic cable 30. The control interface unit 22 is linked to CCU 10 using a section of standard triaxial cable 14A. Similarly, the camera interface unit 24 is linked to camera 12 using a triaxial cable section 14B.

The control interface unit 22 and the camera interface unit 24 each provide an electro/optical and opto/electrical conversion function. The control interface unit 22 converts electrical signal CU received on triaxial cable 14A to provide optical signal OCU on fiber optic cable 30. The optical signal OCU is transmitted on fiber optic cable 30 to the camera interface unit 24 where it is converted back to electrical signal CU and coupled to the triaxial cable 14B and passed to camera 12. In a similar manner, the camera interface unit 24 converts electrical signal CA received from the camera 12 on triaxial cable 14B to provide optical signal OCA which is transmitted on fiber optic cable 30 to the control interface unit 22. The control interface unit 22 converts the optical signal OCA back to electrical signal CA for transmission to the CCU 10 on triaxial cable 14A.

Figure 3:
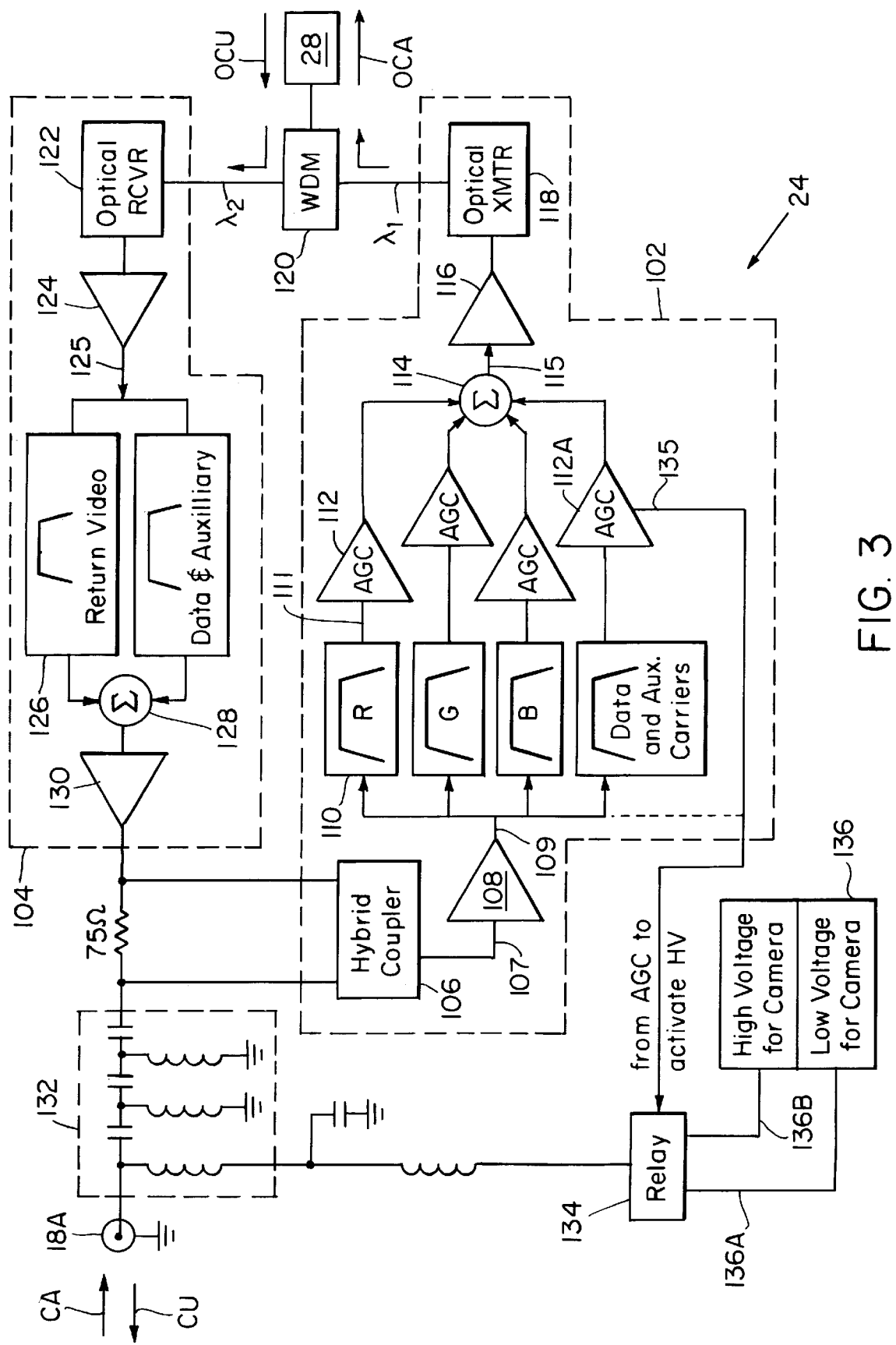
FIG. 3 is a schematic block diagram of a fiber optic triaxial camera interface unit in accordance with the present invention.
Figure 4:
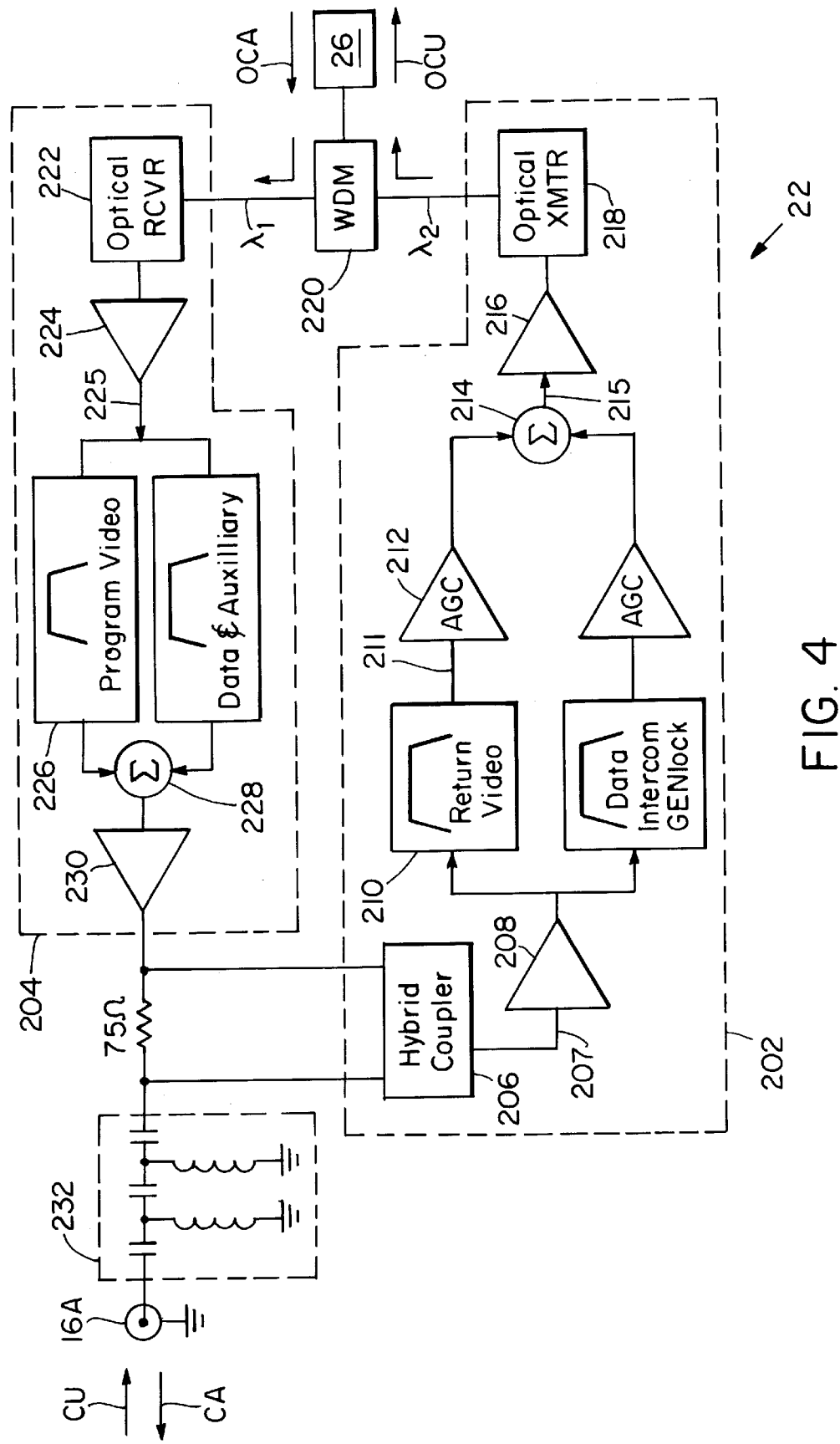
FIG. 4 is a schematic block diagram of a fiber optic triaxial camera control interface unit in accordance with the present invention.

Referring to FIGS. 3 and 4, the camera interface unit 24 and the control interface unit 22 will now be described in more detail. The triaxial camera interface unit 24 shown in the schematic block diagram of FIG. 3 includes an electro/optical converter circuit 102 and an opto/electrical converter circuit 104. Electrical signal CA from camera 12 is coupled to input 18A. As noted above, the electrical signals CA and CU are conventional television signals typically arranged in a frequency division multiplex (FDM) format of the individual video, audio, and control signals which in aggregate have a typical bandpass of about 100 MHz. A hybrid coupler circuit 106 separates out the incoming electrical signal CA from the outgoing electrical signal CU. The output of the hybrid coupler 106 at line 107 is coupled through a preamp circuit 108 to a parallel configuration of bandpass filters 110.

Each of the bandpass filters 110 is operative to pass one of the signals in the electrical input signal CA. For example, red, green and blue (RGB) component video signals are typically sent from the camera 12 to the CCU 10. Each of these RGB component video signals will have modulated an RF carrier in the camera 12 such that the RF carriers form a frequency division multiplexed signal that can be applied at line 109 to the parallel arrangement of bandpass filters 110. For example, in many triaxial cameras provided by Ikegami, the RGB components are transmitted at 18, 36, and 54 MHz carriers, respectively. In contrast, many triaxial camera provided by Sony send video as luminance and chrominance signals occupying 18 and 36 MHz carriers respectively, rather than using RGB components. It should be noted that the RF signals in general can be amplitude modulation or frequency modulation signals. In addition to the RGB component or luminance/chrominance signals, data and auxiliary carriers may be included in the overall electrical signal CA at yet other carrier frequencies.

The output 111 of each bandpass filter 110 is coupled to an automatic gain control (AGC) circuit 112 to automatically set the level of the respective filtered signal. The AGC circuitry is used to compensate for differing triaxial cable lengths. The embodiment herein described provides for locating a camera more than 50,000 feet away from a base station housing the CCU 10 without requiring repeaters or equalization.

The leveled signals are coupled to a summing circuit 114. The summed signal 115 feeds a driver 116 to drive an optical transmitter 118. In an embodiment of the invention, the optical transmitter 118 uses direct optical RF modulation of a laser diode, though other optical transmission schemes can be used. In order to minimize optical fiber usage, the optical transmitter 118 may be coupled to a wavelength division multiplexer (WDM) 120. The optical signal OCA produced by the optical transmitter 118 is at a first wavelength $\lambda 1$, such as 1300 nm. In the opposite direction, the optical signal OCU from the control interface unit 22 is received at line 28 and may be coupled via the WDM 120. The optical signal OCU is at a second wavelength $\lambda 2$, such as 1550 nm. The WDM 120 splits the optical signals $\lambda 1$ and $\lambda 2$.

In another embodiment, the WDM 120 can instead be a two-way coupler, in which case $\lambda 1 = \lambda 2$ with bi-directional transmission on a single optical fiber.

It should be noted that while the preferred embodiment of the present invention employs wavelength division multiplexing to provide transmission of optical signals OCU and OCA on a single optical fiber, other embodiments of the invention can have a separate optical fiber for each direction of transmission. In such embodiments, the wavelength division multiplexing is not employed, and $\lambda 1$ can be the same as $\lambda 2$.

The optical signal OCU is received in an optical receiver 122. The receiver 122 can be an avalanche photodiode type receiver. The output of optical receiver 122 is fed to a preamp circuit 124. The output of preamp circuit 124 is coupled to an arrangement of bandpass filters 126. The optical signal OCU received by optical receiver 122 comprises television signals in an FDM format. Thus, the signal 125 applied to the parallel arrangement of bandpass filters 126 includes return video signals and data/auxiliary signals at different carrier frequencies. Each bandpass filter 126 is operative to pass one of the carrier signals in the composite signal input at 125. The passbands of bandpass filters 126 are selected to match the characteristics of television signals employed by typical triaxial cameras, which in the return direction from the CCU 10 are typically at 10 and 80 MHz. Passband limiting the signal in the return path also prevents oscillation in the system 20. The output of the bandpass filters 126 are summed in summing circuit 128. The summed signal at 128 is coupled to line driver 130 which drives the composite electrical signal CU onto the section of triaxial cable 14B coupled to line 18A (FIG. 2).

In the prior art system shown in FIG. 1, the camera CCU 10 remotely powers the camera 12 over the triaxial cable 14. Since the present invention essentially replaces most of the link 14 with non-conductive fiber optic cable 30 (FIG. 2), the camera 12 needs to receive power in some other manner. In the embodiment of the invention shown in FIG. 3, the camera interface unit 24 provides local power to the camera 12 from power supply 136. The power supply 136 includes low voltage and high voltage outputs 136A, 136B, respectively which are coupled through a relay circuit 134 to the triaxial cable connection 18A. When the camera is in an inactive state, the low voltage signal 136A is supplied to the camera 12 through relay 134. When the camera 12 becomes active, typically indicated by energy being present in the intercom signal, the high voltage signal 136B is supplied through relay 134 to the camera 12. The presence of the intercom signal from the camera 12 is detected in the AGC 112A which generates a camera detect signal 135 for operating relay 134 to select high voltage signal 136B. Thus, with the embodiment of the present invention, the operation of the conventional triaxial camera 12 is unaffected.

A power filter circuit 132 is coupled in series between the input 18A and the converter circuits 102 and 104. The power filter 132 isolates the RF circuitry 102, 104 from the DC power supply 136.

Referring now to FIG. 4, the control interface unit 22 is shown. The control interface unit 22 provides similar functionality to the camera interface unit 24 except that it does not contain power supply circuitry. The control interface unit 22 includes an electro/optical converter circuit 202 and an opto/electrical converter circuit 204. Electrical signal CU from CCU 10 is coupled to input 16A. A hybrid coupler circuit 206 separates out the incoming electrical signal CU from the outgoing electrical signal CA. The output of the hybrid coupler 206 at line 207 is coupled through a preamp circuit 208 to a parallel configuration of bandpass filters 210. Each of the bandpass filters 210 is operative to pass one of the component signals in the electrical input signal CU. The component signals include return video, audio, data and auxiliary carriers. The output 211 of each bandpass filter 210 is coupled to an automatic gain control (AGC) circuit 212 which automatically sets the level of the respective filtered signal. The leveled signals are coupled to a summing circuit 214. The summed signal 215 feeds a driver 216 to drive optical transmitter 218. The optical transmitter 218 is coupled to a fiber path, preferably through wavelength division multiplexer (WDM) 220. The optical signal OCU provided by the optical transmitter 218 is at the second wavelength $\lambda 2$.

In the opposite direction, the optical signal OCA at first wavelength $\lambda 1$ from the camera interface unit 24 is received at line 26, preferably coupled to WDM 220. If used, the WDM 220 splits the optical signals $\lambda 1$ and $\lambda 2$. The optical signal OCA is received in an optical receiver 222. The output of optical receiver 222 is fed to a preamp circuit 224. The output of preamp circuit 224 is coupled to an arrangement of bandpass filters 226. The amplified signal 225 applied to the parallel arrangement of bandpass filters 226 includes one or more program video signals, audio signals, intercom circuits, and data/auxiliary signals at different carrier frequencies. Each bandpass filter 226 is operative to pass one of the carrier signals in the composite signal input at 225. As noted above regarding triaxial camera interface unit 24, the passbands of the bandpass filters 226 and 210 are selected to match the signal characteristics of the specific camera 12 being deployed. The outputs of the bandpass filters 226 are summed in summing circuit 228. The summed signal at 228 is coupled to line driver 230 which drives the composite electrical signal CA onto the section of triaxial cable 14A coupled to input line 16A (FIG. 2).

A power filter circuit 232 coupled in series between the input 16A and the converter circuits 202, 204 isolates the RF converter circuitry from any DC power signals.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. Apparatus for providing an interface between a triaxial cable and a fiber optic cable for transmission of television signals, the apparatus comprising:

a first converter circuit coupled between the triaxial cable and the fiber optic cable operative to convert a first electrical signal having a plurality of first television signals in a frequency division multiplex format received from the triaxial cable to an optical output signal, the first converter circuit comprising:

a plurality of first bandpass filters coupled in parallel to receive the first electrical signal, each filter operative to pass one of the first television signals;

a first summing circuit coupled to each first bandpass filter output and operable to sum the filtered first television signals to provide a first composite electrical signal; and an optical transmitter coupled to the first summing circuit for converting the first composite electrical signal to the optical output signal; and a second converter circuit coupled between the fiber optic cable and the triaxial cable operative to convert an optical input signal received from the fiber optic cable to a second electrical signal wherein the triaxial cable is coupled at one end to the apparatus and is coupled at the opposite end to a camera and wherein the apparatus further comprises a power control circuit coupled to the one end of the triaxial cable and operable to control power to the camera in response to a detect signal received from the first converter circuit.

2. The apparatus of claim 1 wherein the second converter circuit comprises:

optical receiver coupled to the fiber optic cable for converting the optical input signal to the second electrical signal having a plurality of second television signals in a frequency division multiplex format;

a plurality of second bandpass filters coupled in parallel to receive the second electrical signal, each filter operative to pass one of the second television signals; and a second summing circuit coupled to each second bandpass filter output and operable to sum the filtered second television signals to provide a second composite electrical signal coupled to the triaxial cable.

3. The apparatus of claim 1 wherein the first converter circuit further comprise a plurality of automatic gain control circuits, each coupled in series between one of the first bandpass filters and the first summing circuit and operative to set a level of the respective filtered first television signal.

4. The apparatus of claim 1 wherein the apparatus further comprises a power supply circuit coupled to the power control circuit having a low voltage output and a high voltage output, and wherein the power control circuit switches from supplying a low voltage to supplying a high voltage to the camera in response to receiving a camera detect signal from the first converter circuit.

5. The apparatus of claim 1 further comprising an optical coupler for coupling the optical input signal and the optical output signal to a single optical fiber of the fiber optic cable.

6. The apparatus of claim 5 wherein the optical output signal is at a first optical wavelength and the optical input signal is at a second optical wavelength and the optical coupler comprises a wavelength division multiplexer.

7. The apparatus of claim 1 wherein the fiber optic cable comprises first and second optical fibers and wherein the optical output signal is transmitted on the first optical fiber and the optical input signal is received on the second optical fiber.

8. A system for transmission of information signals between a camera and a camera control unit, the camera and camera control unit each having an individual triaxial cable section coupled thereto, the system comprising:
 a fiber optic cable;
 a first interface unit coupled between the respective triaxial cable section of the camera and one end of the fiber optic cable; and
 a second interface unit coupled between the respective triaxial cable section of the camera control unit and the other end of the fiber optic cable;
 wherein each of the first and second interface units comprises:
  a first converter circuit operative to convert a first electrical signal received from the respective triaxial cable section to an optical output signal coupled to the respective end of the fiber optic cable, the first electrical signal including a plurality of first television signals; and
  a second converter circuit operative to convert an optical input signal received from the respective end of the fiber optic cable to a second electrical signal coupled to the respective triaxial cable section, the second electrical signal including a plurality of second television signals;
 wherein the first interface unit further comprises a power control circuit coupled to the respective triaxial cable section and operable to control power to the camera in response to a detect signal received from the respective first converter circuit.

9. The system of claim 8 wherein the first interface unit further comprises a power supply circuit coupled to the power control circuit having a low voltage output and a high voltage output, and wherein the power control circuit switches from supplying a low voltage to supplying a high voltage to the camera in response to receiving a camera detect signal from the first converter circuit.

* * * * *